(12) United States Patent
Ribeiro et al.

(10) Patent No.: US 12,104,563 B2
(45) Date of Patent: *Oct. 1, 2024

(54) AIR CLEANER HOUSING FOR A VEHICLE

(71) Applicant: Volvo Truck Corporation, Gothenburg (SE)

(72) Inventors: Fabio Ribeiro, Curitiba (BR); Carl Löwstedt, Onsala (SE); Mikael Karlsson, Gothenburg (SE); Torbjörn Ågren, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 441 days.

This patent is subject to a terminal disclaimer.

(21) Appl. No.: 17/439,129

(22) PCT Filed: Mar. 15, 2019

(86) PCT No.: PCT/EP2019/056546
§ 371 (c)(1),
(2) Date: Sep. 14, 2021

(87) PCT Pub. No.: WO2020/187385
PCT Pub. Date: Sep. 24, 2020

(65) Prior Publication Data
US 2022/0145836 A1        May 12, 2022

(51) Int. Cl.
*F02M 35/14* (2006.01)
*F02M 35/02* (2006.01)
(Continued)

(52) U.S. Cl.
CPC ........ *F02M 35/14* (2013.01); *F02M 35/0202* (2013.01); *F02M 35/02416* (2013.01);
(Continued)

(58) Field of Classification Search
CPC ...... F02M 35/024; F02M 35/14; F02M 35/12; F02M 35/02441; F02M 35/0202;
(Continued)

(56) References Cited

U.S. PATENT DOCUMENTS 4,580,657 A * 4/1986 Schmeichel .............. F01N 1/08
                                                     181/255
4,790,864 A   12/1988 Kostun
(Continued)

FOREIGN PATENT DOCUMENTS

CA        2057592 A1    6/1992
CN      201486706 U    5/2010
(Continued)

OTHER PUBLICATIONS

International Search Report and Written Opinion for International Patent Application No. PCT/EP2019/056546, mailed Oct. 11, 2019, 17 pages.
(Continued)

*Primary Examiner* — Christopher P Jones
*Assistant Examiner* — Sonji Turner
(74) *Attorney, Agent, or Firm* — Withrow & Terranova, PLLC

(57) ABSTRACT

The invention relates to an air cleaner housing for a vehicle, comprising an outer and an inner circumferential wall, and a space therebetween adapted to house at least one filter element for filtering air, wherein the inner circumferential wall is provided with openings to allow filtered air to pass radially inwardly through the inner circumferential wall. The air cleaner housing comprises a first end and an open second end for fluidly connecting the air cleaner housing to a turbo, the open second end being located opposite the first end. The air cleaner housing comprises a resonator, wherein the entire resonator is encircled by the inner circumferential
(Continued)

wall such that air entering through the inner circumferential wall passes on the outside of the resonator to and through the open second end.

14 Claims, 9 Drawing Sheets

(51) Int. Cl.
  *F02M 35/024* (2006.01)
  *F02M 35/12* (2006.01)
  *F02M 35/16* (2006.01)
(52) U.S. Cl.
  CPC *F02M 35/02441* (2013.01); *F02M 35/02483* (2013.01); *F02M 35/1255* (2013.01); *F02M 35/1277* (2013.01); *F02M 35/164* (2013.01)
(58) Field of Classification Search
  CPC ......... F02M 35/1261; F02M 35/02416; F02M 35/1255; F02M 35/1216; F02M 35/02; F02M 35/1266; F02M 35/0201; B01D 46/2414
  See application file for complete search history.

(56) References Cited

U.S. PATENT DOCUMENTS

| | | | | |
|---|---|---|---|---|
| 6,419,718 | B1* | 7/2002 | Klug | B01D 46/0087 55/504 |
| 8,900,356 | B2* | 12/2014 | Bouhanna | F02M 35/14 96/384 |
| 2003/0126841 | A1 | 7/2003 | Pettipiece | |
| 2007/0000467 | A1 | 1/2007 | Shaw et al. | |
| 2014/0102060 | A1 | 4/2014 | Kato et al. | |
| 2014/0102304 | A1 | 4/2014 | Bouhanna | |
| 2015/0101299 | A1* | 4/2015 | Osendorf | B01D 46/525 55/502 |
| 2016/0102637 | A1 | 4/2016 | Desjardins | |
| 2017/0138322 | A1 | 5/2017 | Cho et al. | |
| 2022/0126232 | A1 | 4/2022 | Ribeiro et al. | |

FOREIGN PATENT DOCUMENTS

| | | |
|---|---|---|
| DE | 1805381 U | 2/1960 |
| DE | 10110029 A1 | 9/2002 |
| DE | 202008010504 U1 | 12/2009 |
| DE | 10110029 B4 | 10/2012 |
| DE | 102013207586 A1 | 11/2013 |
| FR | 985029 A | 7/1951 |
| FR | 1586317 A | 2/1970 |
| GB | 472452 A | 9/1937 |
| GB | 1315163 A | 4/1973 |
| JP | S58163668 U | 10/1983 |
| JP | H0542664 U | 6/1993 |
| JP | H06159175 A | 6/1994 |
| KR | 200471422 Y1 | 3/2014 |

OTHER PUBLICATIONS

International Preliminary Report on Patentability for International Patent Application No. PCT/EP2019/056546, mailed Feb. 16, 2021, 10 pages.
Intention to Grant for European Patent Application No. 19712930.7, mailed Oct. 27, 2022, 35 pages.
Non-Final Office Action for U.S. Appl. No. 17/429,888, mailed Dec. 14, 2023, 10 pages.
First Office Action for Chinese Patent Application No. 20198091380.5, mailed Dec. 28, 2022, 7 pages.
International Search Report and Written Opinion for International Patent Application No. PCT/EP2019/053638, mailed Oct. 14, 2019, 17 pages.
International Preliminary Report on Patentability for International Patent Application No. PCT/EP2019/053638, mailed Feb. 17, 2021, 10 pages.
First Office Action for Chinese Patent Application No. 201980094017.9, mailed Feb. 8, 2023, 9 pages.
Notice of Allowance for U.S. Appl. No. 17/429,888, mailed Mar. 11, 2024, 10 pages.
Corrected Notice of Allowability for U.S. Appl. No. 17/429,888, mailed May 23, 2024, 7 pages.

* cited by examiner

_AIR CLEANER HOUSING FOR A VEHICLE_

This application is a 35 USC 371 national phase filing of International Application No. PCT/EP2019/056546, filed Mar. 15, 2019, the disclosure of which is incorporated herein by reference in its entirety.

TECHNICAL FIELD

The invention relates to an air cleaner hosing for a vehicle. The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

Most trucks today are powered by internal combustion engines. In order to keep the air used in the combustion process clean, the outside air is cleaned through an air filter provided in an air cleaner. Such an air filter is normally replaced on a regular basis (for instance, from on a monthly basis up to on a bi-annual basis) in order to keep the air cleaning function at a desired level. The air filter and air cleaner can be designed in many different shapes and configurations. The most common solution in today's trucks is to use a cylindrical air cleaner with a cylindrical air filter. Trucks are commonly provided with a turbocharger (also referred to simply as a "turbo") for increasing the efficiency and power output of the internal combustion engine. An air filter may, for instance, be provided upstream of the turbo.

When intake valves of an internal combustion engine are opened a noise is generated and tends to propagate all the way to the air cleaner and eventually enter the cab of the truck. Such noise may be experienced by the driver as a disturbance and cause irritation. Thus, it would be desirable to reduce such noise propagation and increase the comfort inside the cab.

There have been various attempts to solve this problem, including attaching to an axial end of an annular filter element a resonator chamber which communicates with the interior of the filter element via an opening in the axial end of the filter element. While this kind of arrangement has the advantage of providing a sound attenuating function, the provision of the resonator comes with disadvantages. The whole arrangement becomes more bulky than if no resonator would have been used (since the arrangement with a filter element and an axially connected resonator requires a longer air cleaner for housing such an arrangement), or if that disadvantage is to be avoided, the effective filter area must be reduced which would affect the air cleaning function.

SUMMARY

An object of the invention is to provide an air cleaner housing for a vehicle, which alleviates the above mentioned drawbacks.

According to a first aspect of the invention, the object is achieved by an air cleaner housing. The air cleaner housing comprises
an outer circumferential wall,
an inner circumferential wall surrounding a geometrical centre axis,
a space between the inner and outer circumferential wall adapted to house at least one filter element for filtering air, wherein the inner circumferential wall is provided with openings to allow filtered air to pass radially inwardly through the inner circumferential wall,
a first end,
an open second end for fluidly connecting the air cleaner housing to a turbo, the open second end being located opposite the first end, wherein the geometrical centre axis extends from the first end towards the open second end, and
a resonator, wherein the resonator is encircled by the inner circumferential wall such that air entering through the inner circumferential wall passes on the outside of the resonator to and through the open second end.

The present invention is based on the realization that an efficient sound attenuation may be obtained without compromising on size or cleaning efficiency by locating a resonator in the space defined by the inner circumferential wall of an air cleaner housing, for instance, placing the resonator coaxially encircled by the inner circumferential wall.

By the provision of an air cleaner housing which comprises a resonator encircled by the inner circumferential wall, no additional bulkiness is added, i.e. it does not result in any extra axial length of the air cleaner. The present invention has the advantage of allowing the same size and cleaning efficiency to be maintained as an air cleaner without a resonator. This also has the further advantage, that filter elements that are normally provided between an inner and outer circumferential wall of an air cleaner housing (such as safety filters and main filters) can also be used with the inventive air cleaner housing without needing to modify such filter elements, since the resonator is located radially inwardly of the inner circumferential wall, while the filter elements are adapted to be located radially outwardly of the inner circumferential wall, and the design of the outside of the inner circumferential wall does not need not to be modified. Furthermore, the invention has the advantage of providing a sound attenuating effect.

By placing the resonator in such way that air that enters through the inner circumferential wall and then passes on the outside of the resonator, for example along the resonator, an adequate fluid flow may be provided to any component (such as a turbo) which is directly or indirectly connected to the open second end of the filter element.

According to at least one exemplary embodiment, the resonator is formed in one piece with the inner circumferential wall. Thus, the resonator may form an integral part of the air cleaner housing. An advantage of this is that the resonator and the inner circumferential wall may be manufactured in one moulding process, using one moulding tool, and therefore allow for a simple manufacturing of the air cleaner housing.

According to at least one exemplary embodiment, the air cleaner housing comprises a plurality of connecting elements formed in one piece with the resonator and the inner circumferential wall, wherein the connecting elements are distributed around the resonator and extend radially from the resonator to the inner circumferential wall. By providing a plurality of connecting elements the stability of the resonator and its position in the air cleaner housing is good, reducing the risk of any displacement or deformation during practical use.

According to at least one exemplary embodiment, said plurality of connecting elements are formed as a plurality of lamellae or spokes which are spaced apart from each other and which are distributed around the resonator. By using lamellae or spokes a good stability of the resonator is achievable without taking up much space, and therefore without obstructing the air flow too much.

According to at least one exemplary embodiment, the resonator has a closed bottom and an open top, the closed bottom being located near the first end of the air cleaner housing and the open top being located near the open second end of the air cleaner housing. By providing the open top of the resonator near the open second end of the air cleaner housing sound waves entering the air cleaner housing will efficiently be guided into the resonator.

According to at least one exemplary embodiment, the closed bottom of the resonator and the inner circumferential wall form part of a cage structure. A cage structure is advantageous since it may be used as a support for a filter element, for example a safety filter, which may be pulled onto the outer surface of the cage structure.

According to at least one exemplary embodiment, the resonator has the general shape of a straight cylinder. This allows for simple manufacturing and dimensioning of a resonance chamber within the resonator.

According to at least one exemplary embodiment, the resonator has the general shape of a straight circular cylinder. This also allows for simple manufacturing and dimensioning of a resonance chamber within the resonator. Additionally, in embodiments in which the inner circumferential wall, which surround the resonator, is also circular a uniform airflow around the resonator may be provided.

According to at least one exemplary embodiment, the resonator has a top edge defining an opening through which sound waves are allowed to enter into, and exit out from, the resonator, wherein the top edge is formed as a circumferentially extending crest having a radius. A curved crest is advantageous for the aerodynamics of the airflow, thus reducing the risk of noise emanating from the airflow.

Normally, apart from the physical length of the resonator an additional air volume outside the resonator will also take part in the actual resonating function. Thus, the effective resonator length is slightly greater than the physical length of the resonator. The air column which is generated will be pumping in the enclosed space of the resonator. When air flows around the top of the resonator, the end correction provided by the additional air volume is altered. Put differently, the additional air volume which would have joined in the pumping action will be blown away, and therefore the effective length of the resonator is shortened. This can be seen as a more blurry peak in a sound reduction (attenuation) diagram and having altered frequency. This disturbance of the effective resonator length caused by the flowing air around the resonator, may be mitigated by appropriately shaping the top edge of the resonator, for instance shaped in accordance with at least the following two exemplary embodiments.

According to at least one exemplary embodiment, the top edge is wave-shaped in the circumferential direction, having alternating peaks and valleys. By making the top edge wave-shaped, the maximum attenuation will be somewhat lowered, but will cover a larger bandwidth, and will not be as sensitive to the air flow.

According to at least one exemplary embodiment, the wave-shape of the top edge is sinusoidal. Again, the maximum attenuation will be somewhat lowered, but will cover a larger bandwidth, and will not be as sensitive to the air flow.

It has been found particularly advantageous for the attenuation and bandwidth coverage to have the peak-to-peak distance, as measured in the circumferential direction from centre to centre of neighbouring peaks, in the range of 10-30 mm, such as 15-25 mm, typically 20 mm.

Furthermore, it has been found particularly advantageous for the attenuation and bandwidth coverage to have the valley-to-peak distance, as measured in the axial direction of the resonator from centre of a valley to centre of a peak, in the range of 5-15 mm, such as 7-13 mm, typically 10 mm.

According to at least one exemplary embodiment, the inner circumferential wall has the general shape of a truncated cone, widening towards the open second end of the air cleaner housing. This has the advantage that a filter element, such as a relatively thin safety filter is easily pulled onto the conical shape, and is then well supported.

According to at least one exemplary embodiment, said open second end of the air cleaner housing comprises an end wall with a central hole for fluidly connecting the air cleaner housing to a turbo, wherein the inner circumferential wall is fixed to said end wall and extends in a direction toward the first end of the air cleaner housing. By attaching the inner circumferential wall to an end wall at the open second end of the air cleaner housing, the inner circumferential wall does not have to be attached to the first end of the air cleaner housing. Said first end may comprise a removable cover, thus providing access to the inside of the air cleaner housing, for instance, for changing filter elements.

According to at least one exemplary embodiment, the inner circumferential wall is snap-fitted, screwed or welded to the end wall. This ensures a good fixation during operation of a vehicle carrying the air cleaner housing.

According to a second aspect of the invention, the object is achieved by a vehicle according to claim 20. Any features, embodiments and advantages of the air cleaner housing of the first aspect are analogously present in a vehicle of the second aspect comprising such an air cleaner housing.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 4b illustrates that a filter element has been mounted in the air cleaner housing shown in FIG. 4a.

DETAILED DESCRIPTION OF EXAMPLE EMBODIMENTS OF THE INVENTION

Figure 1:
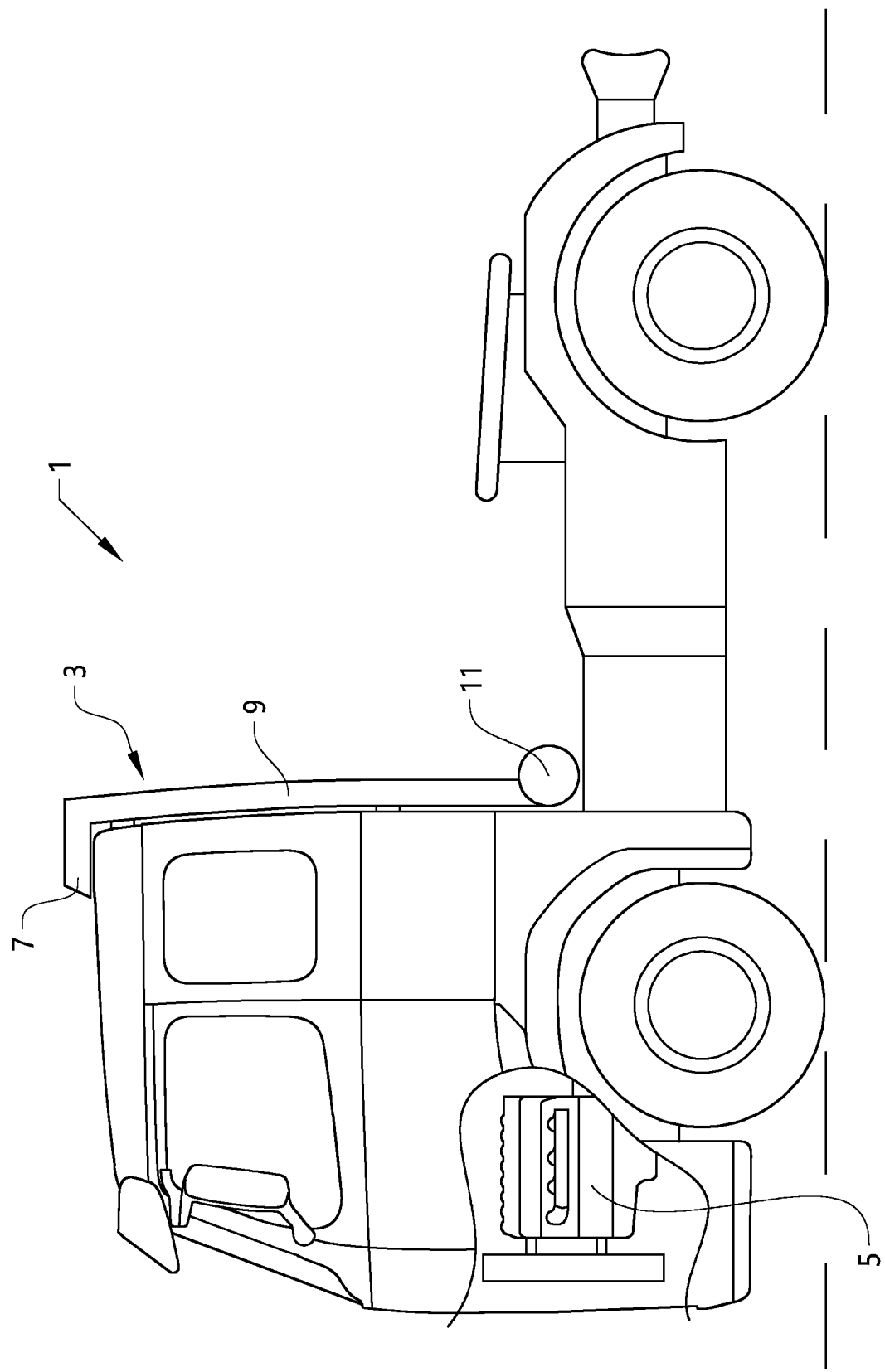
FIG. 1 schematically illustrates a vehicle provided with an air intake arrangement.

FIG. 1 schematically illustrates a vehicle 1 provided with an air intake arrangement 3. In this example, the vehicle 1 is illustrated in the form of a truck, powered by an internal combustion engine 5. However, the air cleaner housing of the present invention may well be implemented also in other types of vehicles, such as busses, construction equipment and passenger cars.

Figure 2:
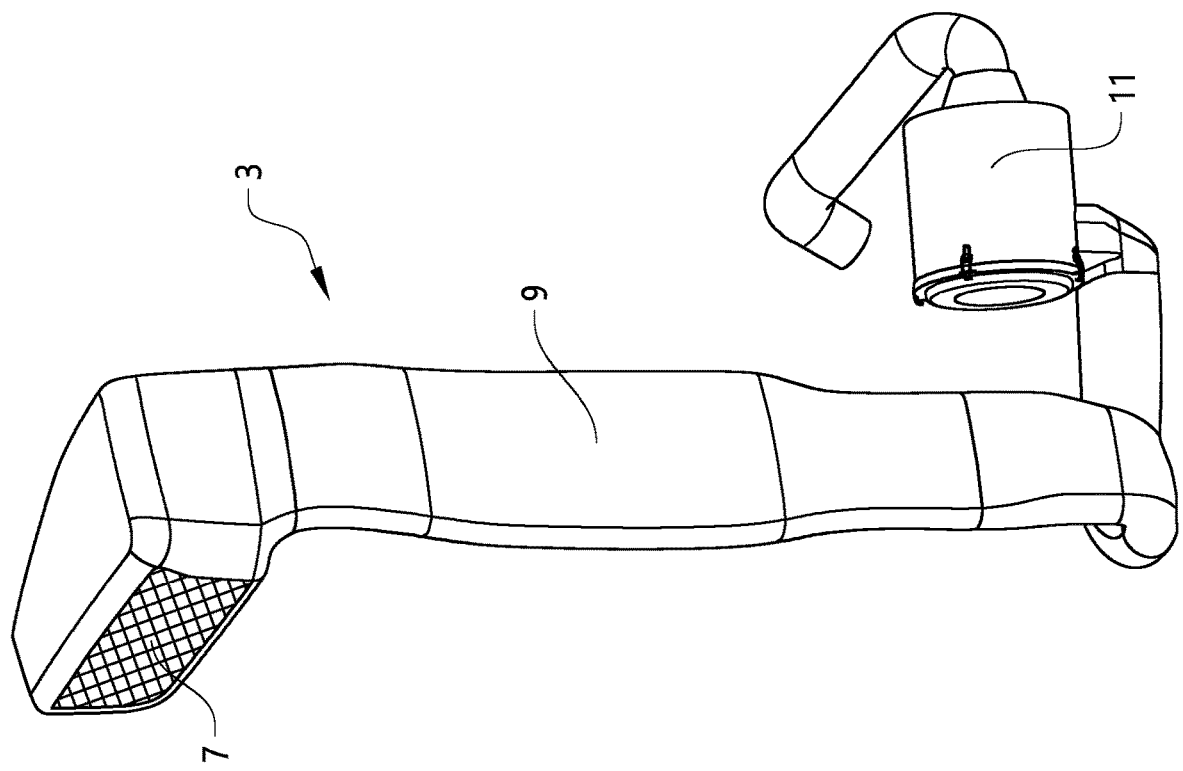
FIG. 2 is a detailed view of the air intake arrangement of FIG. 1, including an air cleaner.

With reference to FIG. 2, which is a detailed view of the air intake arrangement of FIG. 1, the air intake arrangement 3 comprises an air intake 7 in which air enters and moves vertically down an air duct 9. The air flows from the air duct 9 via a connecting elements (such as for example a bellow and turn chamber) to an air cleaner 11. The air cleaner 11 is located in a lower region of the vehicle 1 and the air intake 7 in a higher region of the vehicle 1. In the depicted embodiment of FIG. 1 the air cleaner 11 is located directly behind a vehicle cab, whereas the air intake 7 is located on top of the vehicle cab at a rear end thereof. The air duct 9 is located at the rear end in a generally vertical position of the vehicle cab. The locations of the parts detailed above may well be otherwise.

Figure 3:
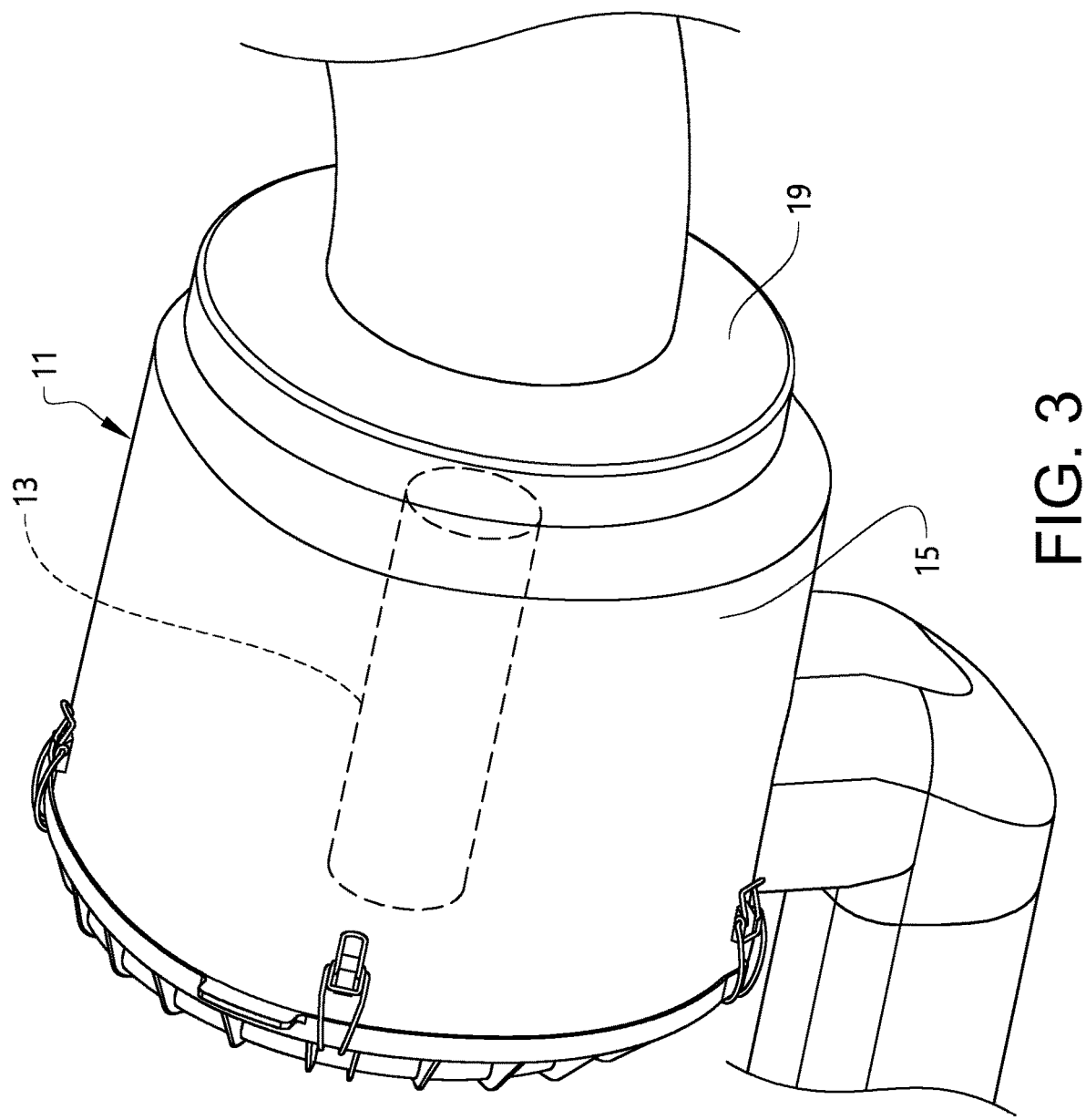
FIG. 3 illustrates a close-up of the air cleaner of FIG. 2, containing a resonator as indicated with dashed lines.

The air cleaner 11 is illustrated as having a generally cylindrical shape, however, other shapes are also conceivable. FIG. 3 illustrates a close-up of the air cleaner 11 of FIG. 2, containing a resonator 13 as indicated with dashed lines. The air cleaner 11 comprises an air cleaner housing 15 and at least one replaceable filter element 17 (visible in FIG. 4b) inside the air cleaner housing 15. As can be seen in FIGS. 2, 3, 4a and 4b, the air enters the air cleaner housing 15 through its enveloping wall, herein referred to as the outer circumferential wall 18, and exits at a top end 19 of the air cleaner housing 15. More specifically, when the air has entered the air cleaner housing 15 the air will spread around the cylindrical filter element 17 (FIG. 4b) and will be directed radially inwardly through the filter element 17 through which the air is filtered. The air is then directed through an inner circumferential wall 20 of the air cleaner housing 15 (the outside of the inner circumferential wall 20 may be covered by a secondary filter element which is not illustrated for sake of clarity) and on to an outlet end, here referred to as an open second end 22, of the air cleaner housing 15 and via connecting elements (such as an intermediate pipe and a turbo inlet bellow) forwarded to a turbo.

It should be understood that in this disclosure, referral is made to orientational terms such as "top", radial" and "circumferential". These terms should be understood as relating to the air cleaner housing 15 being defined based on a cylindrical r, θ, z—coordinate system, wherein the coordinate r defines the radially direction, the coordinate θ defines the circumferential/angular direction and the coordinate z defines the axial direction. Accordingly, as will be discussed in more detail below, a first end 24 and the and second open end 22 of the air cleaner housing 15 are spaced from each other in the axial z-direction. The outer circumferential wall 18 and the inner circumferential wall 20 extend around the central geometrical axis in the θ-direction, but also from the first end 24 towards the open second end 22, i.e. in the z-direction. Thus, it must be understood that even though terms such as top and bottom are used for in this disclosure, they do not relate to the surrounding environment, thus, a top does not have to be located at a vertically higher level compared to a bottom, when the air cleaner housing 15 is mounted in a vehicle 1 (FIG. 1) standing on horizontal ground. In practice, a top and a bottom may be located essentially at the same level compared to the ground, i.e. the air cleaner housing 15 may be mounted so that the z-direction extends parallel with the ground on which the vehicle 1 stands.

Figure 4A:
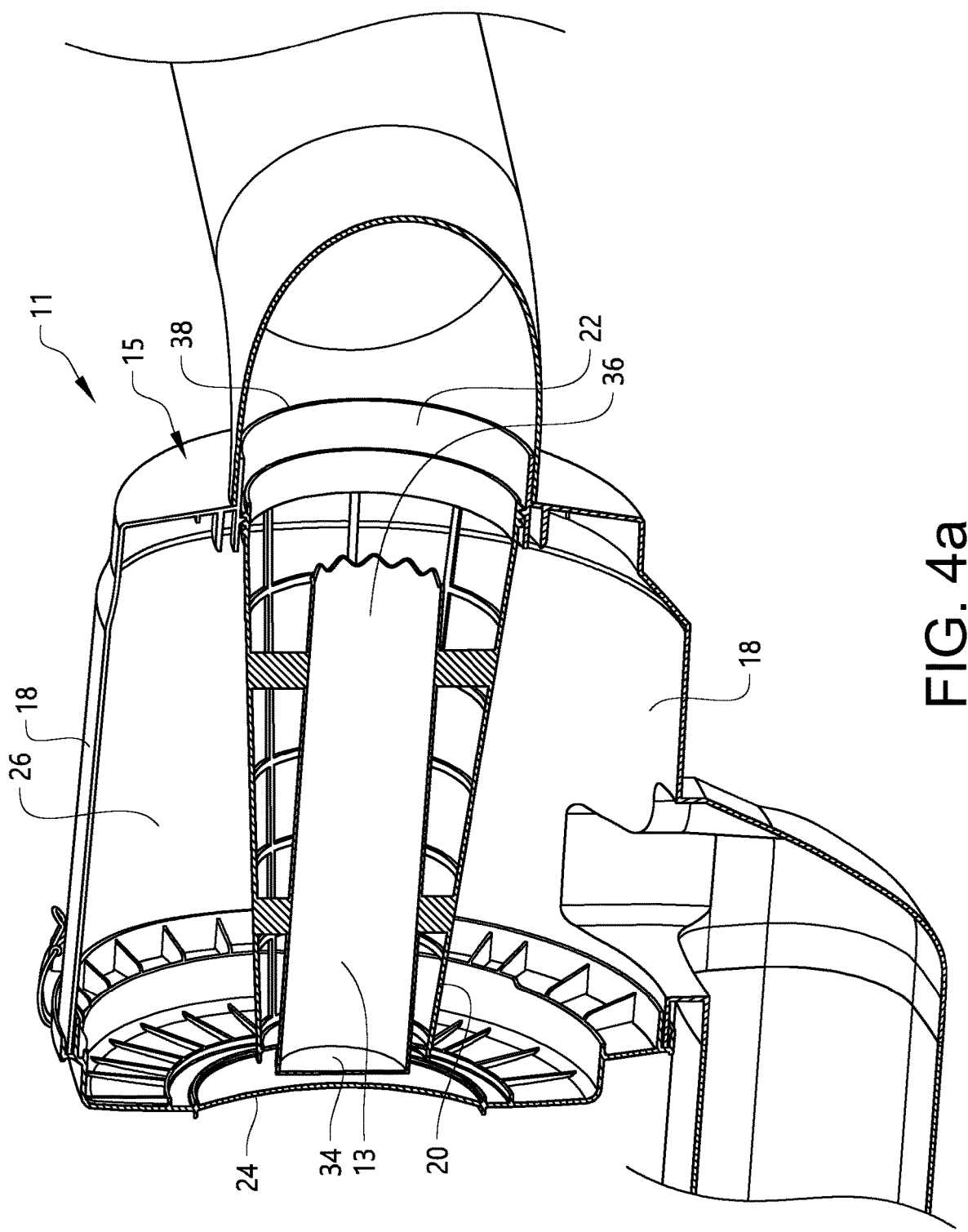
FIG. 4a illustrates a cross-sectional view of the air cleaner of FIG. 3, including an air cleaner housing, wherein an inner circumferential wall of the air cleaner housing is provided with a resonator element, in accordance with an exemplary embodiment of the invention.
Figure 4B:
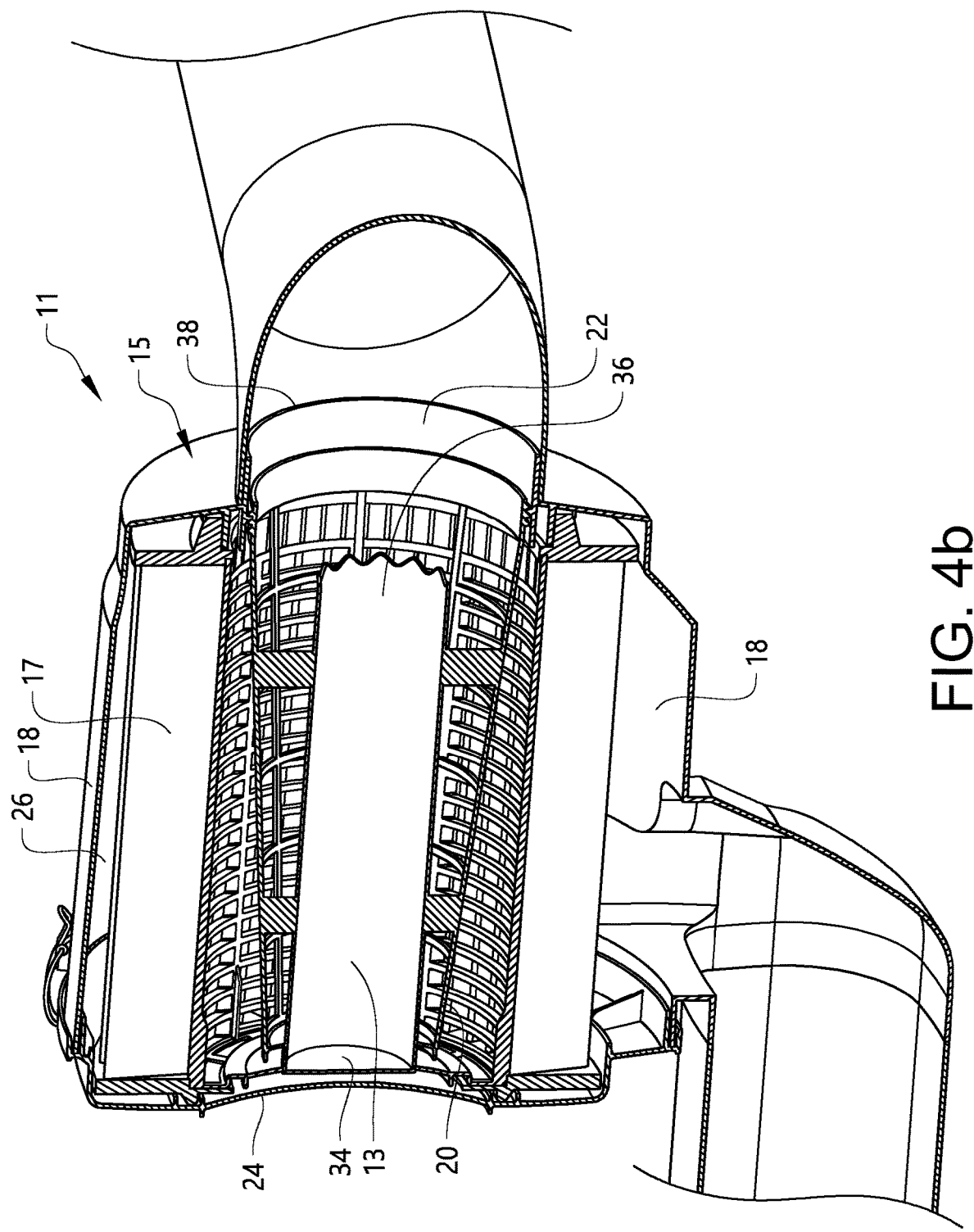

FIG. 4a illustrates a cross-sectional view of the air cleaner 11 of FIG. 3. The air cleaner 11 comprises an exemplary embodiment of an air cleaner housing 15 of the present invention. The inventive air cleaner housing 15 comprises the outer circumferential wall 18 and the inner circumferential wall 20 surrounding a geometrical centre axis extending in the z-direction. The outer circumferential wall 18 may suitably be coaxial with the inner circumferential wall 20. A space 26 is formed between the outer circumferential wall 18 and the inner circumferential wall 20. The space 26 is adapted to house at least one filter element 17 for filtering air. This is shown in FIG. 4b, in which the filter element 17 has been mounted in the space 26. Thus, apart from the air cleaner housing 15 of the present invention, an air cleaner may comprise one or more filter elements. In the present illustrations only a primary filter element 17 is shown for sake of clarity, however, it should be understood that a thin secondary filter element may also be provided and pulled onto and around the inner circumferential wall 20, like a sock. The inner circumferential wall 20 is provided with openings 28 (see FIG. 7) to allow filtered air (i.e. air that has been filtered through the primary filter element and any secondary filter element) to pass radially inwardly through the inner circumferential wall. As can be seen in the exemplary embodiments shown in the drawings the openings are quite large, wherein the inner circumferential wall 20 forms a net or grid structure. Here the net structure is illustrated as including a plurality of axially distributed circles with increasing diameters towards the open second end 22 of the air cleaner housing 15, and tapering lines (tapering axially/radially) distributed around the circles and interconnecting the circles. However, other net structures, as well as other general configurations of an inner circumferential wall 22 provided with openings 28, are of course also conceivable.

The open second end 22 is located opposite the first end 24 of the air cleaner housing 15, wherein the geometrical centre axis extends from the first end 24 towards the open second end 22. The open second end 22 is for fluidly connecting the air cleaner housing to a turbo. The first end 24 may suitably be in the form of a lid or cover which may be opened to provide access to the interior of the air cleaner housing 15, typically to remove a used filter element such as the illustrated filter element 17 and/or any secondary filter element, and to replace the used one with a new one.

The air cleaner housing 15 further comprises a resonator 13, wherein the resonator 13 is encircled by the inner circumferential wall 20 such that air entering through the inner circumferential wall 20 passes on the outside of the resonator 13 and through the open second end 22.

Figure 5:
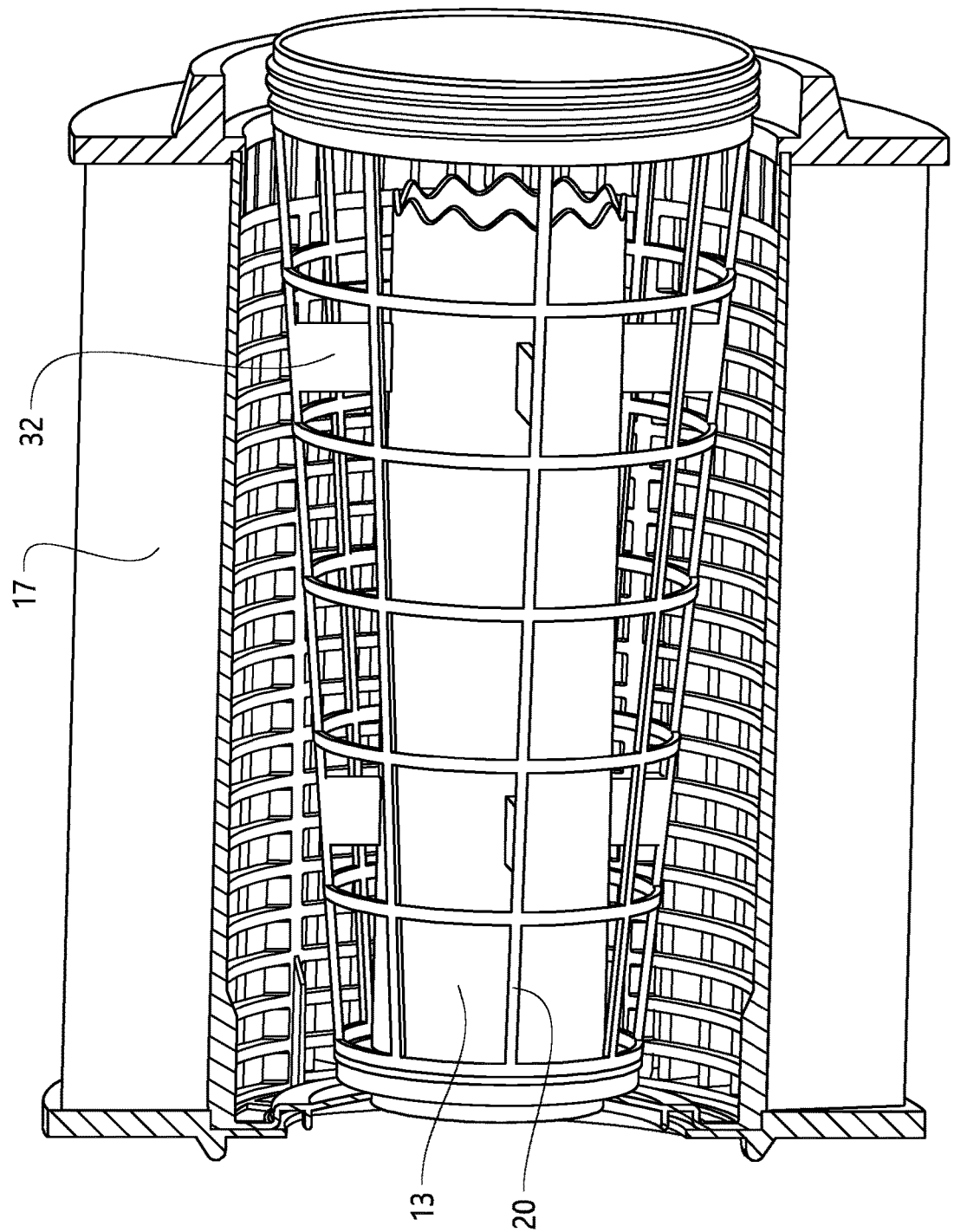
FIG. 5 illustrates a partly cut-away detailed side view of the inner circumferential wall of the air cleaner housing with a replaceable filter element mounted surrounding the inner circumferential wall.
Figure 6:
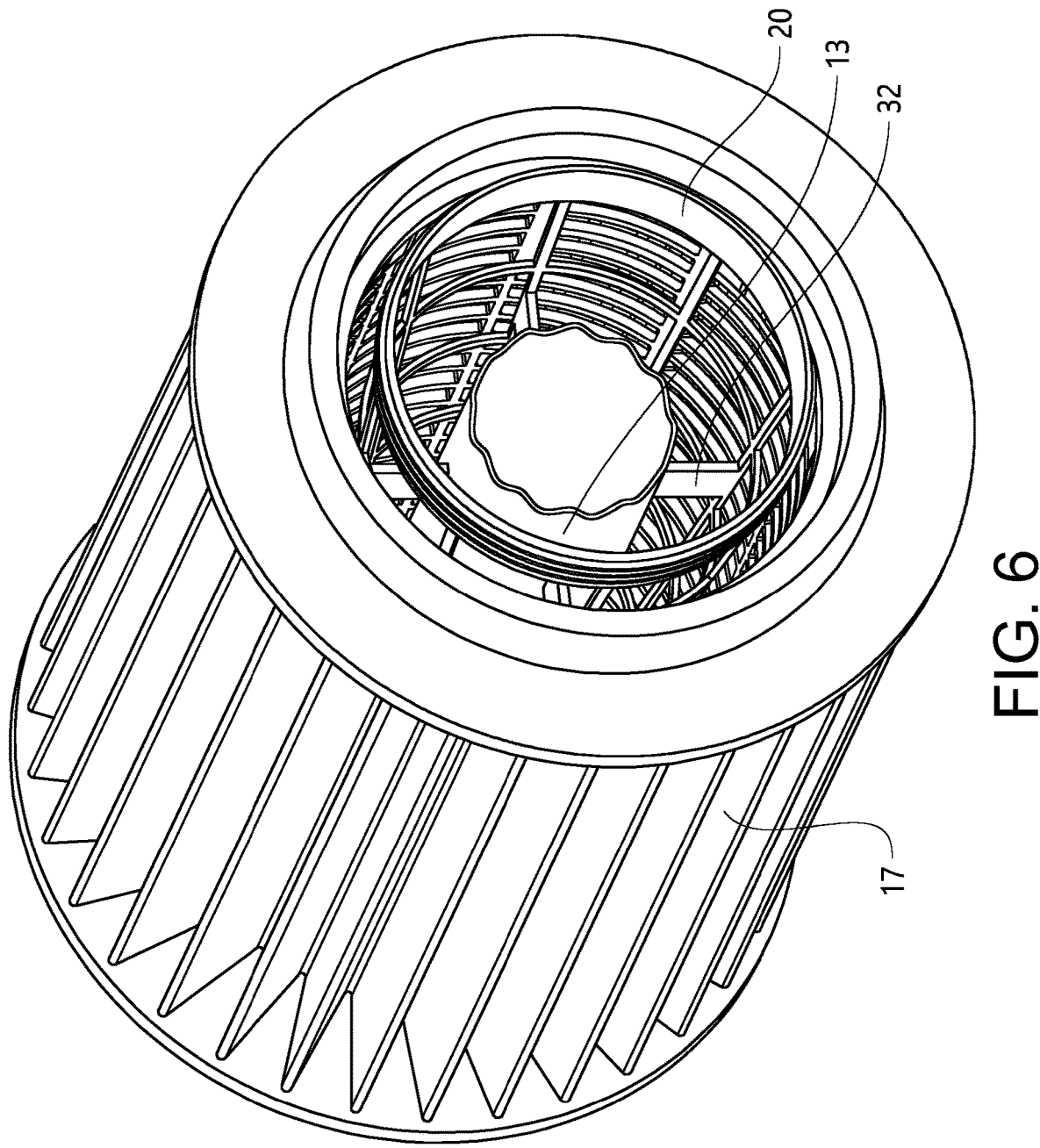
FIG. 6 is a perspective view of the components shown in FIG. 5.
Figure 7:
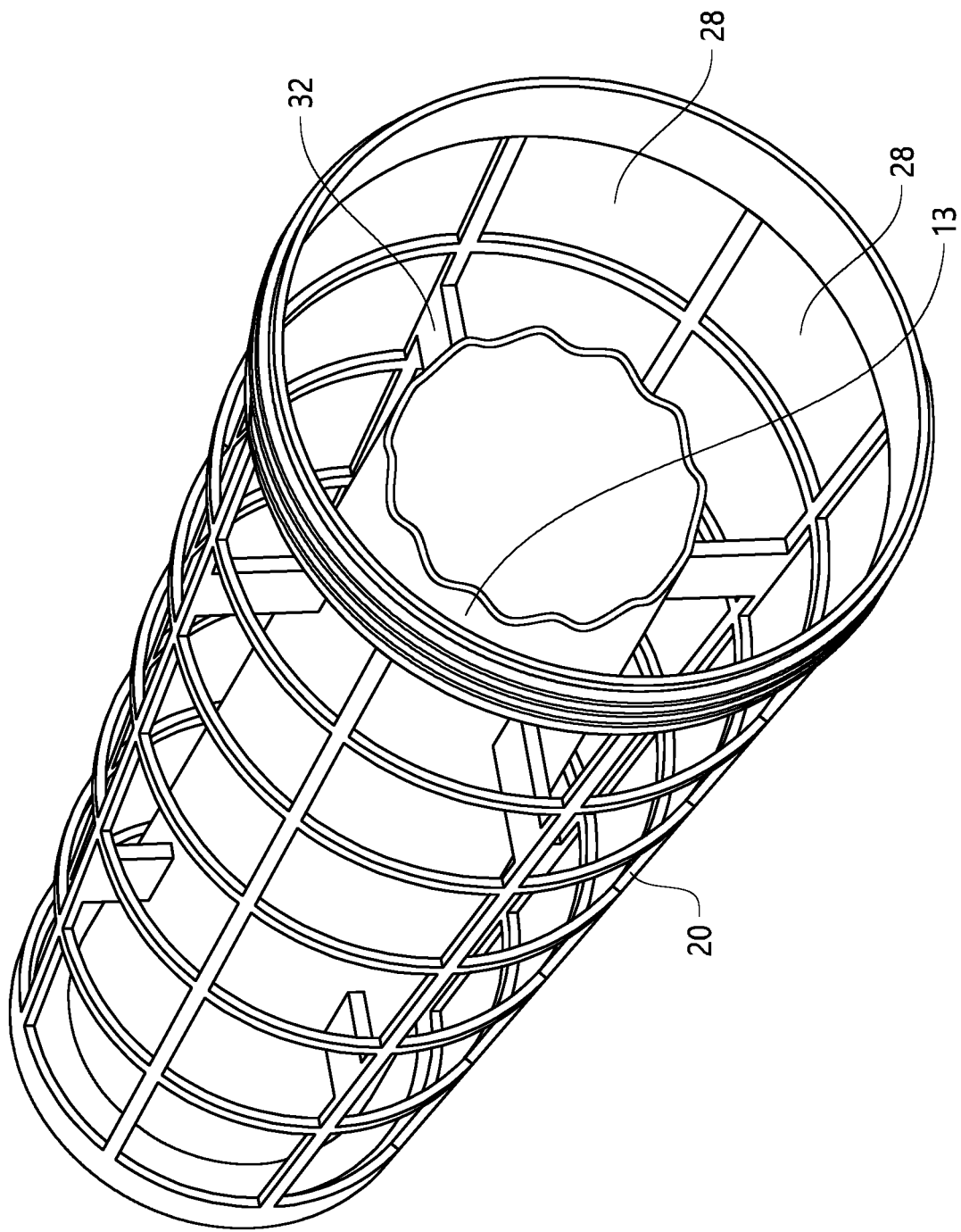
FIG. 7 illustrates an exemplary embodiment of the inner circumferential wall and the resonator before the inner circumferential wall has been mounted to the rest of the air cleaner housing.

FIG. 5 illustrates a partly cut-away detailed side view of the inner circumferential wall 20 of the air cleaner housing with a replaceable filter element 17 mounted surrounding the inner circumferential wall. FIG. 6 is a perspective view of the components shown in FIG. 5. Thus, in FIGS. 5 and 6, the outer circumferential wall of the air cleaner housing is not shown. FIG. 7 illustrates an exemplary embodiment of the inner circumferential wall 20 and the resonator 13 before the inner circumferential wall 20 has been mounted to the rest of the air cleaner housing.

Thus, as can be seen in for instance FIGS. 5-7, the resonator 13 may be formed in one piece with the inner circumferential wall 20, such as by a moulding process. A plurality of connecting elements 32, also formed in one piece with the resonator 13 and the inner circumferential wall 20, are distributed around the resonator 13 and extend radially from the resonator to the inner circumferential wall 20. However, in other exemplary embodiments, the resonator 13 may be formed as a separate piece which is subsequently connected to the inner circumferential wall 20. For instance, the resonator 13 may be formed in one piece with connecting elements 32 (or connecting elements may be attached to the resonator) and then the resonator 13 may with its connecting elements 32 be slid into mating connectors in the inner circumferential wall 20, to create a snap lock. Other ways to connect a separator resonator 13 to the inner circumferential wall 20 are also conceivable, such as by welding or screwing.

The plurality of connecting elements 32 may be formed as lamellae or spokes. Here they are provided at two different locations in the z-direction along the resonator 13. However, fewer of more connecting elements may be provided along the z-direction. It should also be understood that although four plus four connecting elements are shown, other number of connecting elements may be distributed around the resonator.

With reference to FIGS. 4a and 4b, the resonator 13 has a closed bottom 34 and an open top 36, the closed bottom 34 being located near the first end 24 of the air cleaner housing and the open top 36 being located near the open second end 22 of the air cleaner housing 15. It should be noted that in some exemplary embodiments, such as shown in the drawings, the entire resonator 13 is encircled around the inner circumferential wall 20, and does not protrude through the open second end 22 of the air cleaner housing 15. However, in other exemplary embodiments, it would be conceivable to provide a resonator 13 with a longer axial extension. For instance, a portion of the resonator (a lower portion including its bottom) would be encircled by the inner circumferential wall 20, while another portion of the resonator (an upper portion including its top) would not be encircled but project axially beyond the inner circumferential wall 20 and protrude out through the open second end 22 of the air cleaner housing 15.

As can be seen in the shown exemplary embodiments, the closed bottom 34 of the resonator 13 and the inner circumferential wall 20 form part of a cage structure. The inner circumferential wall 20 has the general shape of a truncated conde, widening towards the open second end 22 of the air cleaner housing 15. A thin secondary filter element, not shown, may be pulled onto the outside of the truncated cone shaped inner circumferential wall 20.

As shown in FIGS. 4a and 4b, the open second end 22 of the air cleaner housing comprises an end wall 38 with a central hole for fluidly connecting the air cleaner housing 15 to a turbo, wherein the inner circumferential wall 20 is fixed to the said end wall 38 and extends in a direction towards the first end 24 of the air cleaner housing 15. The inner circumferential wall 20 may be snap-fitted, welded, or as illustrated in FIGS. 4a and 4b, screwed to the end wall 38.

The resonator 13 is illustrated as having a substantially tubular cylindrical shape and extending coaxially with the inner circumferential wall 20 and the outer circumferential wall 18. The resonator 13 is thus, located at the central geometrical axis, while the inner circumferential wall 20 is radially spaced from the resonator 13 (albeit connected via the connecting elements 32).

In the illustrated example embodiment, the resonator 13 is shaped like a straight circular cylinder. However, other cross-sectional shapes, such as rectangular, are also conceivable.

According to one exemplary embodiment, the resonator 13 has a cross-sectional area, calculated as $\pi \cdot (D/2)^2$, where D is the inner diameter of the resonator, the cross-sectional area being in the range of 4000-25000 mm$^2$, such as 4500-6000 mm$^2$, for example 4700-5600 mm$^2$, typically 4900-5300 mm$^2$. According to one exemplary embodiment, the resonator 13 has an axial length in the range of 100-400 mm, such as 250-400 mm, for example 310-370 mm, typically 320-340 mm. A resonator 13 having such a cross-sectional area and length fits most standard heavy duty truck filter element sizes. The illustrated resonator 13 may, for instance, have a cross-sectional area of approximately 5000 mm$^2$ and a length of approximately 330 mm.

Figure 8:
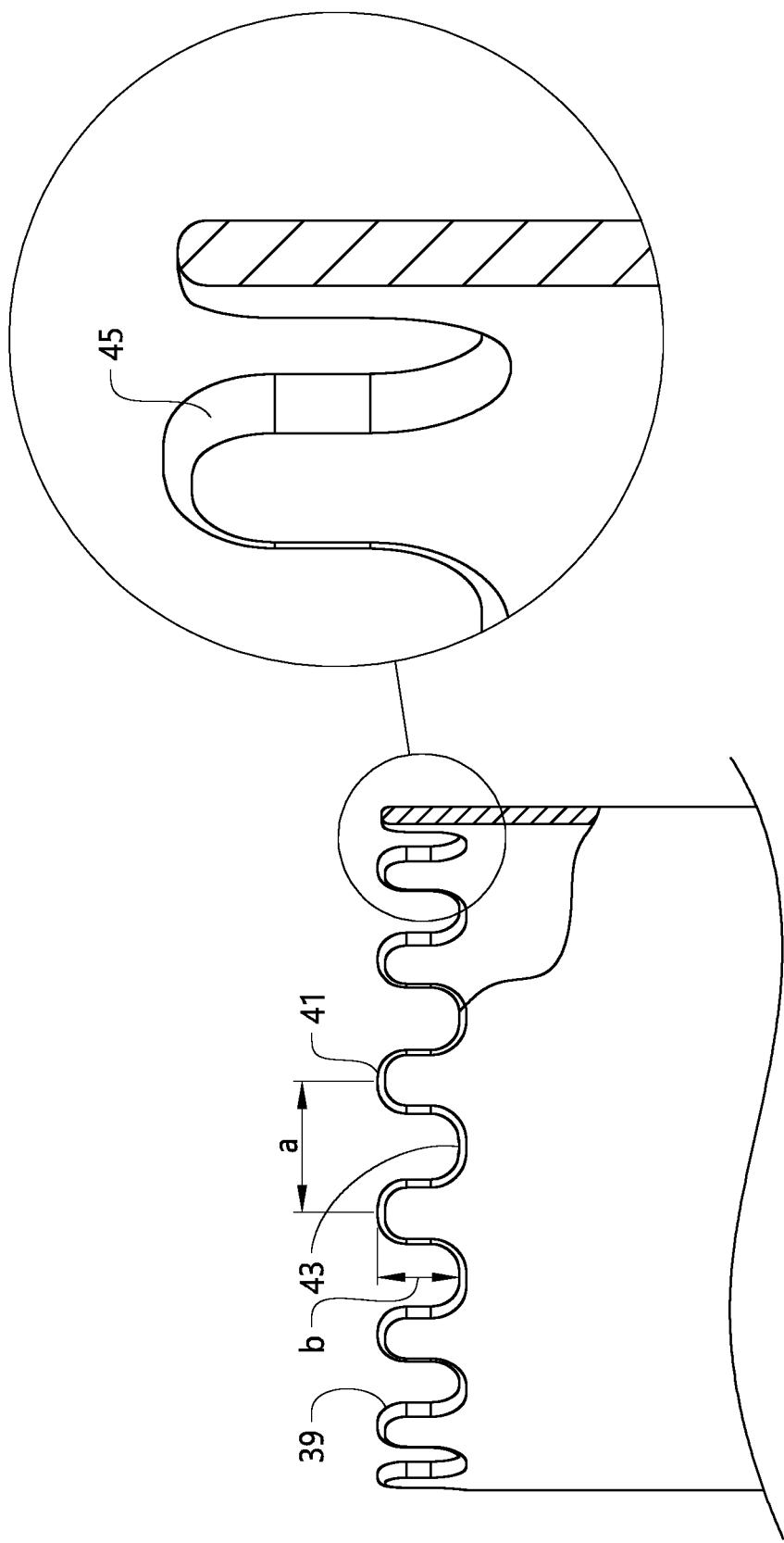
FIG. 8 illustrates a detailed view of the top edge of the resonator.

As illustrated in the detailed view of FIG. 8, the resonator 13 has a top edge 39 defining the opening through which sound waves are allowed to enter into (and exit out from) the resonator 13, in order to attenuate noise propagating to the air cleaner 11 all the way from the intake valves of the internal combustion engine 5 (FIG. 1) when they are opened. Accordingly, the resonator 13 has an inside and an outside. The inside of the resonator 13 defines a physical resonator volume. The outside of the resonator 13 will be subjected to the radially entering air from the inner circumferential wall, which air will flow axially towards the open second end of the air cleaner housing and along the outside of the resonator 13.

The top edge 39 is wave-shaped in the circumferential direction, having alternating peaks and valleys 43. Various wave shapes are conceivable. According at least some exemplary embodiments the wave-shape of the top edge 39 is sinusoidal.

In addition to the physical volume inside the resonator 13 an additional air volume outside the resonator 13 will also take part in the actual resonating function, thus providing an effective resonator length/volume which is slightly greater than the physical length/volume of the resonator 13. As explained above, the air column which is generated will be pumping in enclosed volume of the resonator 13. When air flows around the top of the resonator 13, the end correction provided by the additional air volume is altered. The additional air volume which would have joined in the pumping action will be blown away, and therefore the effective length of the resonator 13 is shortened. This can be seen as a more blurry peak in a sound reduction (attenuation) diagram and having altered frequency. This disturbance of the effective resonator length caused by the flowing air around the resonator 13, may be mitigated by providing an irregular top edge 39 as illustrated in FIG. 8.

In particular, it has been found that a satisfactory attenuation and large bandwidth coverage may be obtained for a peak-to-peak distance a, as measured in the circumferential direction from centre to centre of neighbouring peaks, in the range of 10-30 mm, such as 15-25 mm, typically 20 mm, and similarly it has been found advantageous to have the valley-to-peak distance b, as measured in the axial direction of the resonator 13 from centre of a valley to centre of a peak, in the range of 5-15 mm, such as 7-13 mm, typically 10 mm. The above ranges for the peak-to-peak distance a and the peak-to-valley distance b may be provided for any wave-shaped top edge 39, and in particular for a sinusoidal wave-shape. With these embodiments the sound attenuating effect of the resonator 13 will be less sensitive to the air flow entering through the inner circumferential wall.

As can been seen in the encircled enlargement of the cut-away part drawn in FIG. 8, the top edge 39 is formed as a circumferentially extending crest 45 having a radius. In other words the top edge 39 forms an arched/curved transition from the inside of the resonator to the outside of the resonator 13. This too provides better attenuation effect, as the shape is more aerodynamically shaped than if sharp edges would have been provided, and the airflow will therefore cause less disturbance to the effective resonator volume.

It is to be understood that the present invention is not limited to the embodiments described above and illustrated in the drawings; rather, the skilled person will recognize that many changes and modifications may be made within the scope of the appended claims.

The invention claimed is:

1. An air cleaner housing for a vehicle, comprising:
   an outer circumferential wall;
   an inner circumferential wall surrounding a geometrical centre axis;
   a space between the inner and outer circumferential H-walls configured to house at least one filter element for filtering air, wherein the inner circumferential wall is provided with openings to allow filtered air to pass radially inwardly through the inner circumferential wall;
   a first end;
   an open second end for fluidly connecting the air cleaner housing to a turbo, the open second end being located opposite the first end, wherein the geometrical centre axis extends from the first end towards the open second end; and
   a resonator encircled by the inner circumferential wall such that air entering through the inner circumferential wall passes on the outside of the resonator to and through the open second end, the resonator has a top edge defining an opening through which sound waves are allowed to enter into and exit out from the resonator, the top edge is wave-shaped in the circumferential direction having alternating peaks and valleys.

2. The air cleaner housing of claim 1, wherein the resonator is formed in one piece with the inner circumferential wall.

3. The air cleaner housing of claim 2, comprising a plurality of connecting elements formed in one piece with the resonator and the inner circumferential wall, wherein the connecting elements are distributed around the resonator and extend radially from the resonator to the inner circumferential wall.

4. The air cleaner housing of claim 3, wherein the plurality of connecting elements are formed as a plurality of lamellae or spokes which are spaced apart from each other and which are distributed around the resonator.

5. The air cleaner housing of claim 1, wherein the resonator has a cross-sectional area, calculated as $\pi \cdot (D/2)^2$, where D is the inner diameter of the resonator, the cross-sectional area being in the range of 4000-25000 mm$^2$.

6. The air cleaner housing of claim 1, wherein the resonator has a length in the range of 100-400 mm, such as 250-400 mm.

7. The air cleaner housing of claim 1, wherein the top edge is formed as a circumferentially extending crest having a radius.

8. The air cleaner housing of claim 1, wherein the wave-shape of the top edge is sinusoidal.

9. The air cleaner housing of claim 1, wherein a peak-to-peak distance, as measured in the circumferential direction from centre to centre of a first peak of each of the peaks to a second peak of each of the peaks neighbouring the first peak, is in the range of 10-30 mm.

10. The air cleaner housing of claim 1, wherein a valley-to-peak distance, as measured in the axial direction of the resonator from centre of a valley of each of the valleys to centre of a peak of each of the peaks neighboring the valley, is in the range of 5-15 mm.

11. The air cleaner housing of claim 1, wherein the inner circumferential wall has the general shape of a truncated cone, widening towards the open second end of the air cleaner housing.

12. The air cleaner housing of claim 1, wherein the open second end of the air cleaner housing comprises an end wall with a central hole for fluidly connecting the air cleaner housing to a turbo, wherein the inner circumferential wall is fixed to the end wall and extends in a direction toward the first end of the air cleaner housing.

13. The air cleaner housing of claim 12, wherein the inner circumferential wall is snap-fitted, screwed or welded to the end wall.

14. A vehicle comprising:
   an air cleaner housing comprising:
      an outer circumferential wall;
      an inner circumferential wall surrounding a geometrical centre axis;
      a space between the inner and outer circumferential walls configured to house at least one filter element for filtering air, wherein the inner circumferential wall is provided with openings to allow filtered air to pass radially inwardly through the inner circumferential wall;
   a first end;
   an open second end for fluidly connecting the air cleaner housing to a turbo, the open second end being located opposite the first end, wherein the geometrical centre axis extends from the first end towards the open second end; and
   a resonator encircled by the inner circumferential wall such that air entering through the inner circumferential wall passes on the outside of the resonator to and through the open second end, the resonator has a top edge defining an opening through which sound waves are allowed to enter into and exit out from the resonator, the top edge is wave-shaped in the circumferential direction having alternating peaks and valleys.

* * * * *